Oct. 13, 1925.
B. SANDMANN
1,557,340
SETTLING AND SEPARATING APPARATUS
Filed June 19, 1924
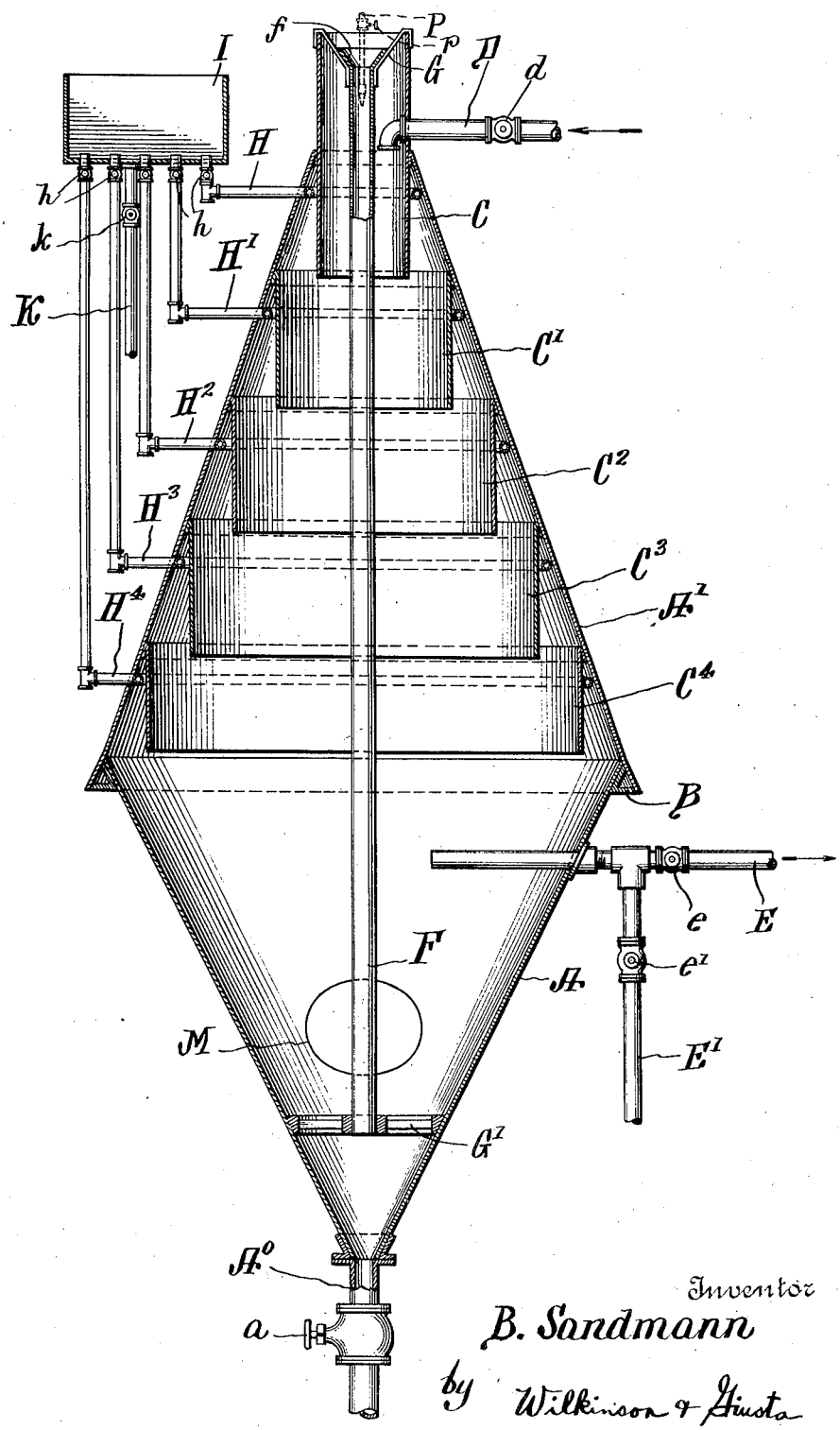
Inventor
B. Sandmann
by Wilkinson & Giusta
Attorneys.

Patented Oct. 13, 1925.

1,557,340

UNITED STATES PATENT OFFICE.

BENNO SANDMANN, OF NEW ORLEANS, LOUISIANA.

SETTLING AND SEPARATING APPARATUS.

Application filed June 19, 1924. Serial No. 721,078.

*To all whom it may concern:*

Be it known that I, BENNO SANDMANN, a citizen of the United States, residing at New Orleans, in the parish of Orleans and State of Louisiana, have invented certain new and useful Improvements in Settling and Separating Apparatus; and I do hereby declare the same to be a full, clear, and exact description of the invention, such as will enable others skilled in the art to which it appertains to make and use the same.

My present invention relates to an apparatus for settling out and separating the solid impurities from solutions carrying solids in suspension, and is especially intended for use in the treatment of raw juice as it comes direct from the cane mill or after it has been heated or treated with any clarifying agent, and the apparatus may be used with the raw juice either cold or in a heated state.

The apparatus is expressly designed to separate from the raw juice a large proportion of the suspended matter before it goes to the filters, clarifiers, evaporators or any other place for further defecation, purification, concentration, or other treatment.

Raw cane juice coming from the mill always carries in suspension a number of impurities comprising vegetable fibre from the crushed bagasse, wax from the bark and joints, more or less albuminous material, and frequently mud or other solid matter originating from the soil. These solid materials impair the action of the filters and clarifiers, and it is very desirable to remove, as far as practicable, these ingredients in the early stages of the treatment of the juice, and this I accomplish by the use of the apparatus hereinafter described.

I am aware that there are various processes and apparatus which have been patented or used to accomplish a similar result, but these have objectionable features, in that they are apt to clog or foul up, which requires the use of scrapers or other mechanical devices for cleansing the same, and such devices are difficult, if not impracticable, to use in apparatus of this character.

Furthermore, various other arrangements tend to promote fermentation due to the lack of ability to keep the same clean.

The purpose of my invention is to provide an apparatus which will run for long periods automatically and without the necessity for frequent cleansing or for mechanical cleaning out, and which will have large capacity and high efficiency when in use.

Reference is made to the accompanying drawing, which shows a central vertical section through the complete apparatus, parts being shown in elevation. The apparatus comprises an outer shell or casing, preferably in the form of two frustums of cones A and $A^1$, joined together at their bases. At the joint, a supporting ring B may be placed to support the apparatus upon some convenient platform or support, not shown.

The bottom of the shell or casing is provided with a drain pipe $A^0$, controlled by the valve $a$. The top of the casing is open. Down through this open top projects the cylinder C, which is open at both ends.

Mounted in the conical portion $A^1$ of the casing, below and exterior to the cylinder C, are a number of short cylinders $C^1$, $C^2$, $C^3$, and $C^4$, each cylinder being open at top and bottom, but the upper ends of the various cylinders C, $C^1$, $C^2$, $C^3$, and $C^4$, being secured to the wall of the casing to form a tight joint, beneath which joint is an annular chamber in the form of an inverted V in cross section, into which the clear liquid will tend to rise as will be hereinafter described.

D represents a supply pipe for conveying the raw or treated juice to the casing, the flow through which may be controlled by the valve $d$.

E represents a pipe for drawing off the liquid from the upper portion of the cone shaped chamber A, the flow through which may be controlled by the valve $e$. This would be used for drawing off liquid only periodically as will be hereinafter described. This pipe may also be used to wash out the system, being provided with a branch pipe $E^1$ controlled by the valve $e^1$ connected to a source of hot or cold water.

F is a drain pipe which extends axially through the casing and near the top thereof terminates in a funnel $f$. The purpose of this pipe and funnel is to carry off the scum and foam that rises to the top of the apparatus, as will be hereinafter described.

This pipe F may be held in place in any convenient way, as by means of the straps G, and spider $G^1$.

H. $H^1$, $H^2$, $H^3$ and $H^4$ represent pipes connected to the upper portion of the inverted V shaped annular chambers surrounding the corresponding cylinders C to $C^4$. These pipes, H to $H^4$, have their outer ends opening into the tank I, from which the clear liquid may be drawn by the pipe K, having a valve $k$.

The flow of liquid through each of the pipes H to $H^4$ may be controlled by a valve $h$, one being provided for each pipe.

The operation of the device is as follows:

Assuming the apparatus to be completely empty, and the pipe D connected to the source of liquid supply, close the valves $e$ and $a$, and open the valves $d$, $h$ and $k$, permitting the liquid to flow in through the pipe D.

As this liquid rises in the casing, the heavier solid particles will tend to settle in the bottom of the chamber A and the clear liquid will tend to rise into the upper portions of the inverted V-shaped annular chambers surrounding the various cylinders $C^4$ to C. As the liquid rises in the casing, the scum and froth will accumulate in the center thereof, and overflowing in the cylinder will flow into the funnel $f$. The clear liquid will escape through the pipes $H^4$ to H, respectively, and will flow into the clear liquid tank I, whence it will be carried off through the pipe K.

Should it be desirable to control the flow of clear liquid through any one of the pipes $H^4$ to H, this may be done by manipulating one of the valves $h$. Thus, for instance, if the liquid is running muddy from the pipe $H^4$, the corresponding valve may be closed, or partly closed, permitting only the clear liquid from the pipes above to escape into the tank I. In the same way, the flow of clear liquid through the other pipes may be varied at will.

The apparatus may be continuously operated in the manner described, but, from time to time, the accumulation of mud and other foul matter may be withdrawn from the chamber A through the drain pipe $A^0$. If desired, this valve $a$ may be kept partly or wholly open, and a continuous flow of mud and sediment with the foul liquid may escape past the same. The foul liquid may be pumped or otherwise conveyed from the pipe A to any desired place. The treatment of this foul liquid is well known in the art and will not be further described.

The steam injector P extending into the upper end of the pipe F and controlled by the valve $p$ is used to cause downward flow in said pipe F. When the valve $a$ at the bottom of the apparatus is partially or wholly open, the tendency of the material in the tank and in the pipe F is to flow downwards and this is assisted by the steam injector P, the valve $p$ being opened to a more or less extent. The scum which accumulates at the top of the cylinder C overflows into the scum pipe F and is driven down through the pipe by this injector action.

When it is desired to wash out the apparatus for any reason, the valve $d$ may be closed, and the valve $e$ opened and the more or less clear liquid is drawn off through the pipe E, and may be used in any convenient way.

This will leave a mass of foul liquid below the level of the pipe E in the chamber, which may be carried off by the pipe $A^0$.

The casing being empty, it may be flushed with either hot or cold water through the pipe $E^1$, by opening the valve $e^1$, and allowing the fresh water to flow through the pipes $H^4$ to H, thus washing out the system.

If further, or more complete, cleaning is desired, the man-hole M may be removed and a man can get inside with a hose and wash out the system thoroughly by hand.

After the apparatus has been thoroughly washed out, the man-hole M may be put back in place and the operation resumed.

The apparatus will run for some time without cleansing, and the ordinary stops in sugar factories would generally furnish ample opportunity for such cleansing; but, if desired, two or more sets of the apparatus may be used, which will increase production and also afford ample opportunity to cleanse one while the others are in operation.

While I have described this apparatus as especially adapted for the treatment of cane juice, which possesses certain well known characteristics, as just explained, it will be obvious that the same apparatus may be used for the treatment of various other liquids from which heavier solid particles or sediment are to be separated, such for instance, as in the purification of water for city or factory use; and also in metallurgical processes for the separation of slimes from the liquids in which said slimes are carried in suspension, and for various other purposes.

I do not mean to limit the apparatus to any special liquid to be treated or to other details not particularly pointed out in the claims.

It will be noted that the vertical sides of the cylinders C to $C^4$ and the over-hanging shell $A^1$ will, in a large measure, prevent the adhering thereto of solid matter, and thus will facilitate the automatic cleansing of the apparatus when in continuous use, and will also avoid the fermentation resulting from such residue when the apparatus is left empty and unused.

While I have shown an apparatus in its preferred form, it will be obvious that various changes may be made in the construction, combination and arrangement of parts, which could be used without departing from the spirit of my invention, and I do not mean to limit the invention to such details except as particularly pointed out in the claims.

Having thus described my invention, what I claim and desire to secure by Letters Patent of the United States, is:

1. Apparatus of the character described, comprising a casing formed of two frustums of cones connected together at their bases to form a tapered bottom chamber and overhanging upper chamber, a series of concentric short cylinders arranged one above the other and having both ends open, each cylinder forming with the casing an annular chamber having the cross-sectional form of an inverted V, means for supplying the liquid to be treated to the upper chamber and for drawing off the sediment from the bottom chamber, a scum pipe projecting down through the center of the system and having its upper end provided with a funnel, said funnel being spaced apart from the upper cylinder, a tank for clear liquid, a series of pipes opening into said annular chambers and connected to said clear liquid tank, and a pipe opening into said lower chamber for drawing off the liquid therefrom, substantially as and for the purposes described.

2. Apparatus of the character described, comprising a casing formed of two frustums of cones connected together at their bases to form a tapered bottom chamber and overhanging upper chamber, a series of concentric short cylinders arranged one above the other and having both ends open, each cylinder forming with the casing an annular chamber having the cross-sectional form of an inverted V, means for supplying the liquid to be treated to the upper chamber and for drawing off the sediment from the bottom chamber, a scum pipe projecting down through the center of the system and having its upper end provided with a funnel, said funnel being spaced apart from the upper cylinder, a tank for clear liquid, and a series of pipes opening into said annular chambers and connected to said clear liquid tank, substantially as and for the purposes described.

3. Apparatus of the character described, comprising a casing formed of two frustums of cones connected together at their bases to form a tapered bottom chamber and overhanging upper chamber, a series of concentric short cylinders arranged one above the other and having both ends open, each cylinder forming with the casing an annular chamber having the cross-sectional form of an inverted V, means for supplying the liquid to be treated to the upper chamber and for drawing off the sediment from the bottom chamber, a tank for clear liquid, a series of pipes opening into said annular chambers and connected to said clear liquid tank, and a pipe opening into said lower chamber for drawing off the liquid therefrom, substantially as and for the purposes described.

4. Apparatus of the character described, comprising a casing formed of two frustums of cones connected together at their bases to form a tapered bottom chamber and overhanging upper chamber, a series of concentric short cylinders arranged one above the other and having both ends open, each cylinder forming with the casing an annular chamber having the cross-sectional form of an inverted V, means for supplying the liquid to be treated to the upper chamber and for drawing off the sediment from the bottom chamber, a tank for clear liquid, and a series of pipes opening into said annular chambers and connected to said clear liquid tank, substantially as and for the purposes described.

5. Apparatus of the character described, comprising a casing formed of two frustums of cones connected together at their bases to form a tapered bottom chamber and overhanging upper chamber, a series of concentric short cylinders arranged one above the other and having both ends open, each cylinder forming with the casing an annular chamber having the cross-sectional form of an inverted V, means for supplying the liquid to be treated to the upper chamber and for drawing off the sediment from the bottom chamber, and a series of pipes for carrying off the clear liquid opening into said annular chambers, substantially as and for the purposes described.

6. Apparatus of the character described, comprising a casing formed of two frustums of cones connected together at their bases to form a tapered bottom chamber and overhanging upper chamber, a series of concentric short cylinders arranged one above the other and having both ends open, each cylinder forming with the casing an annular chamber having the cross-sectional form of an inverted V, means for supplying the liquid to be treated to the upper chamber and for drawing off the sediment from the bottom chamber, a scum pipe projecting down through the center of the system and having its upper end provided with a funnel, said funnel being spaced apart from the upper cylinder, a series of pipes opening into said annular chambers for drawing off the clear liquid therefrom and a pipe opening into said lower chamber for drawing off the liquid therefrom, substantially as and for the purposes described.

7. Apparatus of the character described, comprising a casing formed of two frustums of cones connected together at their bases to form a tapered bottom chamber and overhanging upper chamber, a series of concentric short cylinders arranged one above the other and having both ends open, each cylinder forming with the casing an annular chamber having the cross-sectional form of an inverted V, means for supplying the liquid to be treated to the upper chamber and for drawing off the sediment from the bottom chamber, a series of pipes opening into said annular chambers for drawing off the clear liquid therefrom, and a pipe opening into said lower chamber for drawing off the liquid therefrom, substantially as and for the purposes described.

8. Apparatus of the character described, comprising a casing formed of two frustums of cones connected together at their bases to form a tapered bottom chamber and overhanging upper chamber, a series of concentric short cylinders arranged one above the other and having both ends open, each cylinder forming with the casing an annular chamber having the cross-sectional form of an inverted V, means for supplying the liquid to be treated to the upper chamber and for drawing off the sediment from the bottom chamber, a scum pipe projecting down through the center of the system and having its upper end provided with a funnel, said funnel being spaced apart from the upper cylinder, a steam ejector in said scum pipe, a tank for clear liquid, and a series of pipes opening into said annular chambers and connected to said clear liquid tank, substantially as and for the purposes described.

9. Apparatus of the character described, comprising a casing formed of two frustums of cones connected together at their bases to form a tapered bottom chamber and overhanging upper chamber, a series of concentric short cylinders arranged one above the other and having both ends open, each cylinder forming with the casing an annular chamber having the cross-sectional form of an inverted V, means for supplying the liquid to be treated to the upper chamber and for drawing off the sediment from the bottom chamber, a scum pipe projecting down through the center of the system, a steam ejector in said scum pipe, a series of pipes opening into said annular chambers for drawing off the clear liquid therefrom and a pipe opening into said lower chamber for drawing off the liquid therefrom, substantially as and for the purposes described.

BENNO SANDMANN.